(12) United States Patent
O'Neill et al.

(10) Patent No.: US 9,047,868 B1
(45) Date of Patent: Jun. 2, 2015

(54) LANGUAGE MODEL DATA COLLECTION

(75) Inventors: Jeffrey C. O'Neill, Somerville, MA (US); Ryan P. Thomas, Redmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 381 days.

(21) Appl. No.: 13/563,648

(22) Filed: Jul. 31, 2012

(51) Int. Cl.
*G10L 21/00* (2013.01)
*G10L 15/197* (2013.01)

(52) U.S. Cl.
CPC .................................. *G10L 15/197* (2013.01)

(58) Field of Classification Search
USPC ............... 704/1–10, 251, 255, 257, 235, 231, 704/270.1; 707/5
See application file for complete search history.

(56) References Cited

U.S. PATENT DOCUMENTS

| | | | |
|---|---|---|---|
| 8,209,178 B1 * | 6/2012 | Talbot et al. | 704/255 |
| 2007/0250501 A1 * | 10/2007 | Grubb et al. | 707/5 |
| 2010/0211378 A1 * | 8/2010 | Bulyko | 704/9 |
| 2012/0053935 A1 * | 3/2012 | Malegaonkar et al. | 704/235 |
| 2013/0325436 A1 * | 12/2013 | Wang et al. | 704/9 |

OTHER PUBLICATIONS

David Talbot and Miles Osborne, "Smoothed Bloom filter language models: Tera-Scale LMs on the Cheap," Proceedings of the 2007 Joint Conference on Empirical Methods in Natural Language Processing and Computational Natural Language Learning, pp. 468-476, Jun. 2007.
Abby D. Levenberg, "Bloom Filter and Lossy Dictionary Based Language Models," 2007.
David Guthrie et al., "Efficient Minimal Perfect Hash Language Models," Proceedings of the Seventh International Conference on Language Resources and Evaluation, pp. 2889-2896, May 19-21, 2010.

* cited by examiner

*Primary Examiner* — Huyen Vo
(74) *Attorney, Agent, or Firm* — Knobbe, Martens, Olson & Bear, LLP (57) ABSTRACT

A specific language model for speech recognition may be built. In some embodiments, the specific language model is associated with a user and built using a corpus of text obtained from a user computing device. In some embodiments, a sequence of words is constructed from the corpus of text. The sequence of words may be obfuscated, and the obfuscated sequence of words may be stored in the specific language model. A server or a user device may use the specific language model in conjunction with a general language model to perform speech recognition on an utterance made by the user.

34 Claims, 8 Drawing Sheets

LANGUAGE MODEL OBFUSCATION PROCESS

300

| N-Gram | Frequency | Hash Value |
| --- | --- | --- |
| Cat is sleeping | 5 | 00101101 |
| Today is cloudy | 6 | 10011101 |
| Eating burnt food | 1 | 01111101 |
| Water is hot | 8 | 00101101 |
| Hold the chair | 3 | 01111101 |
| Are you there | 11 | 10010011 |

302

| Hash Value | Count |
| --- | --- |
| 00101101 | 13 |
| 10011101 | 6 |
| 01111101 | 4 |
| 10010011 | 11 |

304

| Hash Value | Count |
| --- | --- |
| 0010 | 13 |
| 1001 | 17 |
| 0111 | 4 |

LANGUAGE MODEL DATA COLLECTION

BACKGROUND

Language models and acoustic models may be used to facilitate speech recognition. For example, an acoustic model may be used to identify phonemes or other speech units present in an utterance. A language model may then be used to convert the phonemes or other speech units identified by the acoustic model into words, phrases, and the like. For example, an n-gram language model may be generated by analyzing a large corpus of text to determine the frequency with which sequences of n words (or "n-grams") appear in the text. The frequencies may be used to generate n-gram probabilities. For example, a unigram probability may be the probability that a word occurs, a bigram probability may by the probability that a word follows another word, and a trigram probability may be a probability that a word follows a sequence of two words. A speech recognizer may receive an utterance that may correspond to two or more possible word sequences with different probabilities. The language model may be used to determine the probabilities of each of the word sequences that correspond to the utterance and select the word sequence with the highest probability.

A language model may be a general language model that models the average word probabilities of speakers across large, diverse populations of individuals. A language model may also be a specific language model that is adapted to particular types of speakers or individuals. For example, a language model may be created that is specifically adapted to medical terms used by doctors. A general language model and a specific language model may be combined using a process known as language model interpolation. Speech recognition that uses a specific language model may be more accurate than speech recognition that uses only a general language model.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Introduction

A language model, such as a general purpose language model, may contain a large number of n-grams generated from a general corpus of text associated with large, diverse populations of individuals. However, people speak and communicate in different ways (e.g., with different speech patterns, accents, vocabularies, etc.). Therefore, a general purpose language model may provide less accurate or inconsistent results among individuals, since it is not tailored to a particular person or household. It may be desirable to build other language models that are adapted to a group of people (e.g., a household) or a single person that, when used alone or in conjunction with the general purpose language model, may result in more accurate speech recognition.

Accordingly, aspects of the present disclosure are directed to building language models, and specifically language models associated with specific groups of people or specific persons. To create a language model that is adapted to a group or a person, language data is needed that is specific to the group or person. This language data may come from various sources. For example, as a user uses a speech recognition system, the words spoken may be saved and used to create a language model.

Other data sources may be available as well. For example, a person's smartphone may have large amounts of relevant text, such as email messages, text messages, address book entries, calendar entries, and so forth. All of this information may be used to create a language model. Other computing devices, such as desktop computer, laptop computer, or a table may also have similar information.

Other information relevant to an individual's (or group's, household's, etc.) vocabulary, interests, language usage, etc., may be available on a network, such as a local area network. Information such as email messages and the content of web pages may be transmitted on a network. Where this information is observable, it can also be used to create a specific language model. By using these various sources of information, a language model may be created that is specific to a group or person, and this specific language model may be used to improve speech recognition.

The information used to create the specific language model may be personal in nature, and users may prefer trading off speech recognition accuracy against maintaining privacy. For example, to maintain privacy, the relevant information may be immediately converted into a less comprehensible format such as n-gram counts. To further maintain privacy, the information may be hashed, for example, by using a Bloom filter.

In some embodiments, a language model may be created for speech recognition in a household, where one or many people may live. The speech recognition may use a general language model and a specific language model that is adapted to the persons in the household. The household may contain one or more devices that have speech recognition capabilities. Such devices could include a personal computer, a tablet, a smartphone, or any other device with a microphone. The speech recognition may be performed in the household, on a server, or a combination of the two. The specific language model may be stored in the household, on a server, or a combination of the two.

The various embodiments disclosed may implement methods to protect users' privacy. For example, where the specific language model is stored only on a device in the household, there may not be significant privacy concerns as the user's personal information would not leave the household. In this embodiment, detailed information about the person may be stored on a device in the household, and techniques such as encryption and firewalls may be used to prevent access to the information. In this embodiment, speech recognition may be performed in multiple passes. Speech recognition may be performed on a server using a general language model, and speech recognition results (e.g., in the form of a lattice) may be transmitted to a device in the household. A device in the household may then perform a second pass of speech recognition using the specific language model and the general language model's output.

In some embodiments, portions of the specific language model may be stored on a server. To protect a user's privacy, the user's information may be processed to limit the information that leaves the household. For example, the information may be processed on a device in the household to convert the information into n-grams and only the n-gram information is transmitted to a server. The user's privacy may be further protected by batching the n-gram information in large chunks (e.g., transmitting n-gram information at most once a month or after a certain number of n-grams have been processed) or by using smaller values of "n", such as transmitting only unigram or bigram information. In this embodiment, multiple passes of speech recognition may be used as well. For example, a first pass of speech recognition may be performed on a server using a less detailed specific language model and a second pass of speech recognition may be performed on a device in the household using a more detailed specific language model.

In some embodiments, portions of the specific language model may be stored on a server and hashing techniques may be used to obscure the information in the specific language model. For example, a Bloom filter may be used to store the specific language model. The number of bits of the hash key in the Bloom filter may be adjusted according to a user's privacy concerns. In some embodiments, a Bloom filter may be used on a server with a fewer number of bits and a Bloom filter may be used on a device in the household with a greater number of bits.

In other embodiments, the specific language model may be created for other embodiments. For example, a specific language model may be created for an office environment, for particular businesses (e.g., a coffee shop or a bar), or for an individual using speech recognition on a single device, such as a phone.

Aspects of the present disclosure may be practiced in a networked computing environment. For example, a speech recognition server device may host a speech recognition service on a network. During the language model building process, a corpus of text may be received by a text processing device from a user device directly or through the network. N-grams may be extracted from the corpus of text and used to build and update a specific language model associated with the user. During speech recognition, an utterance may be received (e.g., through a microphone or receiver) by a speech user interface. The utterance (or a sequence of words associated with the utterance) may be transmitted to the speech recognition server device and transcribed by the speech recognition server device using the specific language model and/or a general purpose language model. The transcribed utterance may be transmitted back to the speech user interface, or instead directly to a recipient computing device designated by a user of the speech user interface.

The speech user interface may also have access to the specific language model to facilitate speech recognition. For example, the speech user interface may have the specific language model stored therewith. The speech user interface may receive an utterance (e.g., through a microphone or receiver) and transmit the utterance to the speech recognition server device. The speech recognition server device may use the general purpose language model to produce speech recognition results, and may transmit the speech recognition results to the speech user interface. The speech user interface may refine the speech recognition results using the specific language model and select a word sequence. The selected word sequence may be read to the user, converted into a control command, or transmitted to another user.

Illustrative Network Environment

Figure 1:
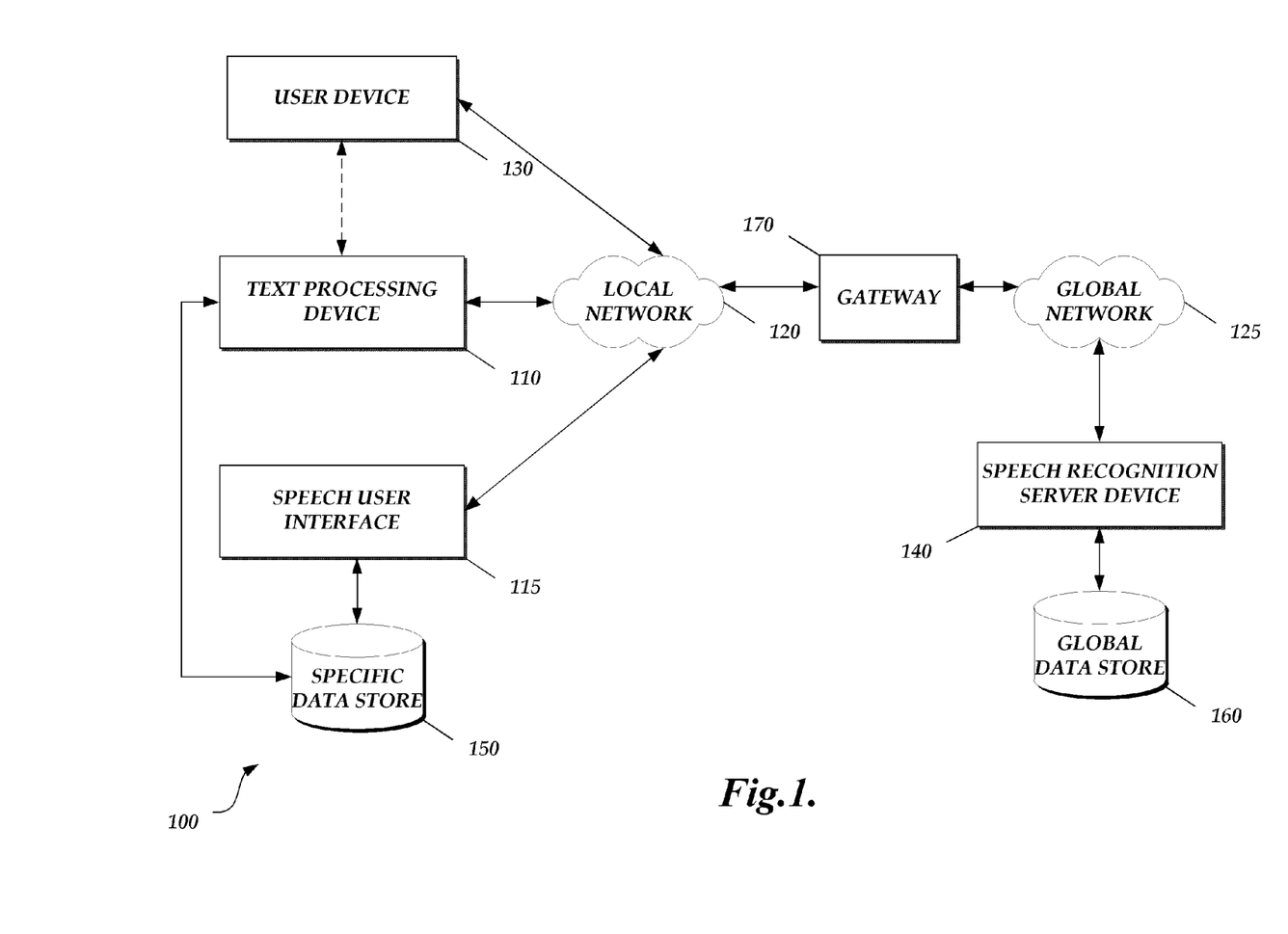
FIG. 1 is a system diagram depicting a speech recognition computing device in an illustrative network environment.

FIG. 1 illustrates a system diagram depicting a speech recognition service in an illustrative network environment 100. In some embodiments, the network environment 100 includes a text processing device 110, a speech user interface 115, a local network 120, a global network 125, a user device 130, a speech recognition server device 140, a specific data store 150, a global data store 160, and/or a gateway 170.

The text processing device 110 may be a computing device. For example, the text processing device 110 may be an electronic device, such as a laptop or tablet computer, personal computer, personal digital assistant (PDA), hybrid PDA/mobile phone, mobile phone, global positioning system (GPS) device, electronic book reader, set-top box, camera, clock, audiobook player, digital media player, video game console, in-store kiosk, television, one or more processors, integrated components for inclusion in computing devices, appliances, electronic devices for inclusion in vehicles or machinery, gaming devices, or the like. The text processing device 110 may include a microphone, a speaker, a wireless module, a camera, and/or a display. The text processing device 110 is described in greater detail with respect to FIG. 6.

In an embodiment, the text processing device 110 is configured to facilitate the creation and update of a specific language model, where the specific language model is associated with the user of the text processing device 110 or the user device 130 and/or a household in which the text processing device 110 or the user device 130 is located.

The text processing device 110 may be located within a house or other location associated with the user, group of users, household, etc. The text processing device 110 may be intermittently active or may become active upon a particular predetermined condition. For example, the text processing device 110 need not be active at all times, but may instead automatically become active: (1) at predetermined times, (2) when data (e.g., a corpus of text) is detected or received, (3) upon the occurrence of other events or conditions, or a combination of the above.

The text processing device 110 may be in communication with a specific data store 150. The specific data store 150 may store information associated with the user. For example, the specific data store 150 may include the specific language model associated with the user. In some embodiments, the specific data store 150 is a single data store. In other embodiments, the specific data store 150 is distributed over many different locations.

The text processing device 110 may also be in communication with a user device 130 directly or through a local network 120. The local network 120 may be a wired network, a wireless network, or a combination of the two. For example, the local network 120 may be a personal area network, a local area network (LAN), or combinations of the same, such as a network that allows devices within a household or devices associated with a group of people to communicate with each other. Protocols and components for communicating via any of the other aforementioned types of communication networks, such as the TCP/IP protocols, can be used in the local network 120.

The user device 130 may be a computing device. For example, the user device 130 may be an electronic device associated with a user, such as the user that resides in the same household as the text processing device 110, and that the user uses for communication purposes. The user device 130 may be a cell phone, a smart phone, a tablet, a laptop, a personal digital assistant (PDA), a computer, a desktop, a workstation, a server, a terminal, a kiosk, a clock, or the like. While the network environment 100 illustrates a single user device 130, the network environment 100 may include any number of user devices 130 and the text processing device 110 may be in communication with some or all of the user devices 130.

The speech user interface 115 may be in communication with the local network 120 and/or the specific data store 150. The speech user interface 115 may be configured to receive an utterance and facilitate speech recognition. For example, the speech user interface 115 may receive the utterance and forward the utterance via the local network 120 to the speech recognition server device 140 to receive speech recognition results, as described below. The speech user interface 115 may also participate in the speech recognition process by using the specific language model stored in the specific data store 150 to evaluate the utterance or to further process the output (e.g., a lattice of possible word sequences) received from the speech recognition server device 140, as described below.

In an embodiment, the speech user interface 115 is a computing device. For example, the speech user interface 115 may be an electronic device, such as a cell phone, a smart phone, a tablet, a laptop, a personal digital assistant (PDA), a computer, a desktop, a workstation, a server, a terminal, a kiosk, a clock, or the like. In another embodiment, the speech user interface 115 is a module or application that is executed by another device, such as the text processing device 110 or the user device 130.

In an embodiment, as illustrated in FIG. 1, the text processing device 110, the speech user interface 115, and the user device 130 are separate devices. In other embodiments, not shown, the functionality of the text processing device 110, the speech user interface 115, and the user device 130 may be combined into one or more devices. For example, the user device 130 may be able to create and update a specific language model and/or facilitate speech recognition.

In some embodiments, the text processing device 110 and/or the speech user interface 115 may be in communication with the speech recognition server device 140 through the local network 120, the gateway 170, and the global network 125. Like the local network 120, the global network 125 may be a wired network, a wireless network, or a combination of the two. For example, the global network 125 may be a personal area network, a local area network (LAN), a wide area network (WAN), cable network, satellite network, cellular telephone network, the Internet, and/or combinations of the same. Protocols and components for communicating via the Internet or any of the other aforementioned types of communication networks, such as the TCP/IP protocols, can be used in the global network 125. The gateway 170 may be configured to control communications between the local network 120 and the global network 125. For example, the gateway 170 may be a firewall, a switch, a router, or the like. In other embodiments, the network environment 100 uses a single network such that a gateway is not utilized.

The speech recognition server device 140 may be a computing device. For example, the speech recognition server device 140 may include one or more processors to execute one or more instructions, memory, and communication devices to transmit and receive data over the global network 125. In some embodiments, the speech recognition server device 140 is implemented as one or more backend servers capable of communicating over a network. In other embodiments, the speech recognition server device 140 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the speech recognition server device 140 may be represented as a user computing device capable of communicating over a network, such as a laptop or tablet computer, personal computer, personal digital assistant (PDA), hybrid PDA/mobile phone, mobile phone, global positioning system (GPS) device, or the like. While FIG. 1 illustrates a single text processing device 110 and a single speech user interface 115, the speech recognition server device 140 may be in communication with a plurality of text processing devices 110 and/or speech user interfaces 115.

In an embodiment, the speech recognition server device 140 is in communication with the global data store 160. The global data store 160 may store general purpose acoustic and/or language models and one or more specific language models. For example, the global data store 160 may store specific language models associated with users of different user devices 130. As described below, the specific language models stored in the global data store 160 may be the same or different than the specific language models stored in the specific data store 150. In some embodiments, the global data store 160 is a single data store. In other embodiments, the global data store 160 is distributed over many different locations.

In some embodiments, the speech recognition server device 140 is configured to create and/or update specific and/or general purpose language models stored in the global data store 160. The speech recognition server device 140 may be further configured to facilitate the recognition of speech uttered by the user.

Collectin Language Model Data

In an embodiment, the text processing device 110 collects or receives data from a variety of sources in a variety of ways to create and/or update a specific language model. For example, the text processing device 110 may collect or receive data from devices that are located near the text processing device 110 or that communicate via the local network 120.

In an embodiment, the text processing device 110 may collect data that originated from the user device 130. For example, the text processing device 110 may receive a corpus of text that originated from the user computing device 130. The corpus of text may have originated from an electronic message sent or received by the user device 130, a document stored or opened on the user device 130, a music library stored or opened on the user device 130, a contact list stored or opened on the user device 130, or the like.

In an embodiment, the text processing device 110 may collect the data (e.g., the corpus of text) by directly coupling to the user device 130 to extract the corpus of text. For example, the text processing device 110 may directly connect to the user device 130 via a wired connection, a wireless connection, or combinations thereof. The text processing device 110 may execute an application that browses through data stored or generated by the user device 130 and extracts corpora of text that may be used to create or update a specific language model.

In another embodiment, the text processing device 110 may collect the data (e.g., the corpus of text) by receiving the corpus of text from the user device 130. For example, the user device 130 may include an application that, when executed by the user device 130, shares data stored or generated by the user device 130, such as corpora of text. The application may be configured to share the data with any device in communication with the user device 130 or with a device that processes language model data (e.g., the text processing device 110 or the speech recognition server device 140). In some embodiments, the application allows a device to extract the shared data. In other embodiments, the application executes instructions to transmit the shared data to a device.

In another embodiment, the text processing device 110 may collect the corpus of text by monitoring local network 120 traffic. For example, the text processing device 110 may monitor data generated by the user device 130 and transmitted via the local network 120. The text processing device 110 may capture the data as it is transmitted between the user device 130 and the gateway 170 or between the user device 130 and another device on the local network 120. In some embodiments, the gateway 170 may be configured to capture data transmitted by the user device 130 or intended for the user device 130 and transmit copies of such data to the text processing device 110.

In some embodiments, the text processing device 110 collects additional information associated with the collected or received data (e.g., metadata associated with the collected or received data). For example, the text processing device 110 may collect information related to a source of the collected or received data (e.g., whether the corpus of text originated from an electronic message, a document, a music library, etc.), information identifying a person to whom the data applies, a date and/or time when the data was generated (e.g., a timestamp indicating when the corpus of text was generated, etc.), or the like. This information may be used to refine a specific language model, such as by using the timestamp to remove text from the specific language model that is older than a predetermined time.

The text processing device 110 may collect or receive data (e.g., corpora of text) and its associated information from the user device 130 on an on-going basis. Such data and its associated information may be stored in internal and/or external memory. Periodically, the text processing device 110 may forward the data stored in the internal and/or external memory to the specific data store 150 and/or to the speech recognition server device 140 for storage in the global data store 160.

Processing Language Model Data

The user information collected as described above may be used to create a specific language model. For example, an n-gram language model may be created. This specific language model may be used to improve speech recognition. In some embodiments, the specific language model may be sent to a server, such as the speech recognition server device 140, and used with a general purpose language model to produce speech recognition results. In some embodiments, the specific language model may be used only locally to refine speech recognition results provided by the server.

A number of measures may be taken to protect users' privacy. In some embodiments, the user information may be processed locally, and only the results of the processing may be sent to a server. For example, n-grams could be created locally and only the n-grams could be sent to a server.

In some embodiments, the number n may depend on a privacy setting of the user device 130 and/or the text processing device 110. For example, if the privacy setting is set to a low value (e.g., less privacy is desired), the number n may be a higher value (e.g., approximately 10). If the privacy setting is set to a high value (e.g., more privacy is desired), the number n may be a lower value (e.g., approximately 2 or 3). A lower n value may provide greater privacy because a sequence of fewer words may make it more difficult to decipher the original text.

In some embodiments, further privacy protections may be obtained by obscuring the language model data. For example, the language model data may be obscured by using a Bloom filter as described with respect to FIGS. 2A-B and FIG. 3.

Figure 2A:
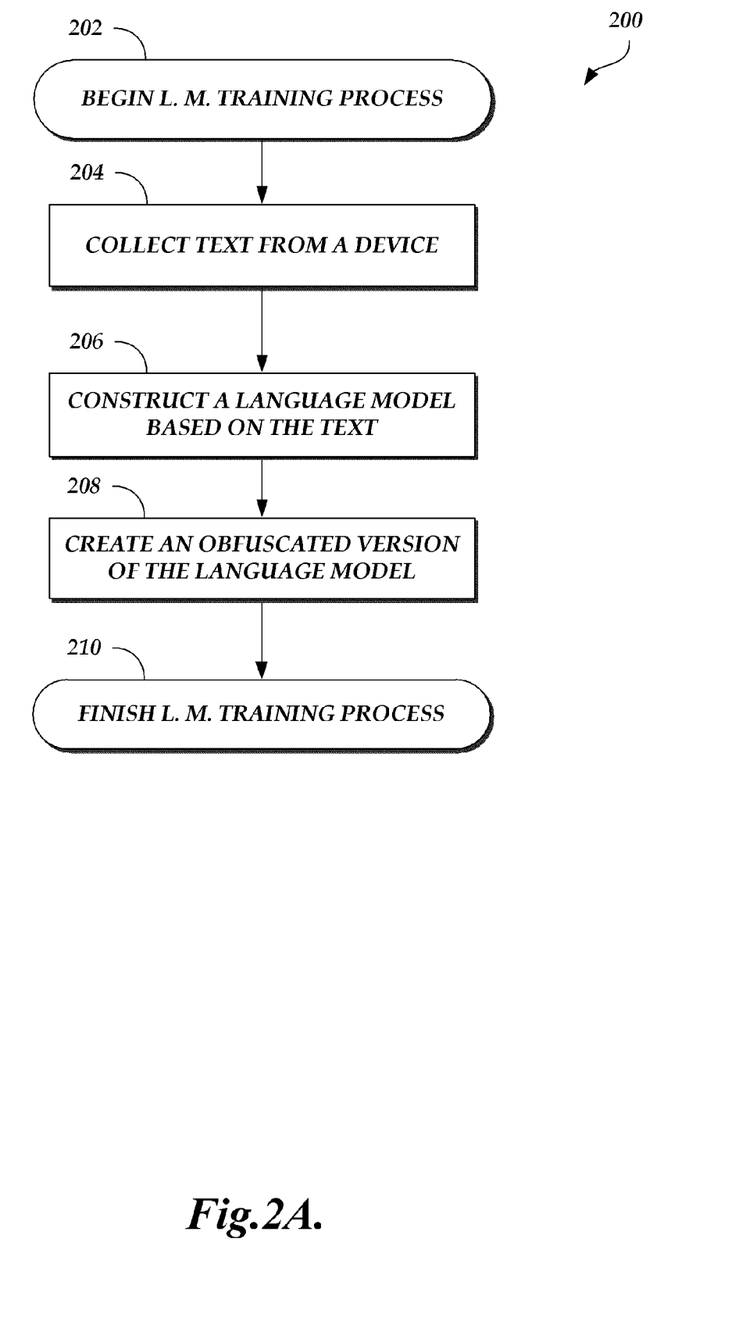
FIG. 2A is a flow diagram depicting an illustrative routine for building a specific language model.

FIG. 2A illustrates a routine 200 for building a specific language model. A text processing device 110, as described herein with respect to FIGS. 1 and 6, may be configured to execute the routine 200. The routine 200 begins at block 202. The routine 200 may be an interactive routine initiated on demand by a user or an automated routine, such as might be executed on a periodic or aperiodic schedule. In one example, a user (or users) may generate, download, or otherwise associate him or herself with a large amount of natural language text (e.g., a corpus of text) that may be used to build (e.g., train) a specific language model (L.M.) associated with the user (or users). The routine 200 may build and update the specific language model prior to using the specific language model in a speech recognition system. In some cases, the routine 200 may be used to update a specific language model that has already been created, either by the routine 200 or by some other routine.

At block 204, the routine 200 may collect a corpus of text. For example, as described above, the device that executes the routine 200 (i) may request text from a user device, (ii) may receive the corpus from the user device via an application running on the user device, and/or (iii) may collect the corpus by monitoring network traffic to and/or from the user device.

At block 206, the routine 200 may construct a language model based on the collected corpus of text. For example, the language model may be an n-gram language model. The n-grams may comprise sequences of words found in the corpus of text.

At block 208, the routine 200 may create an obfuscated version of the constructed language model. The data stored in the constructed language model may be modified such that it may be difficult to decipher the original contents of the constructed language model. For example, the data stored in the constructed language model may be obscured using a Bloom filter. Obscuring data using a Bloom filter is described in more detail below with respect to FIG. 2B. After the contents of the constructed language model are obscured, the creation and/or update of the specific language model may be complete, as shown in block 210.

Figure 2B:
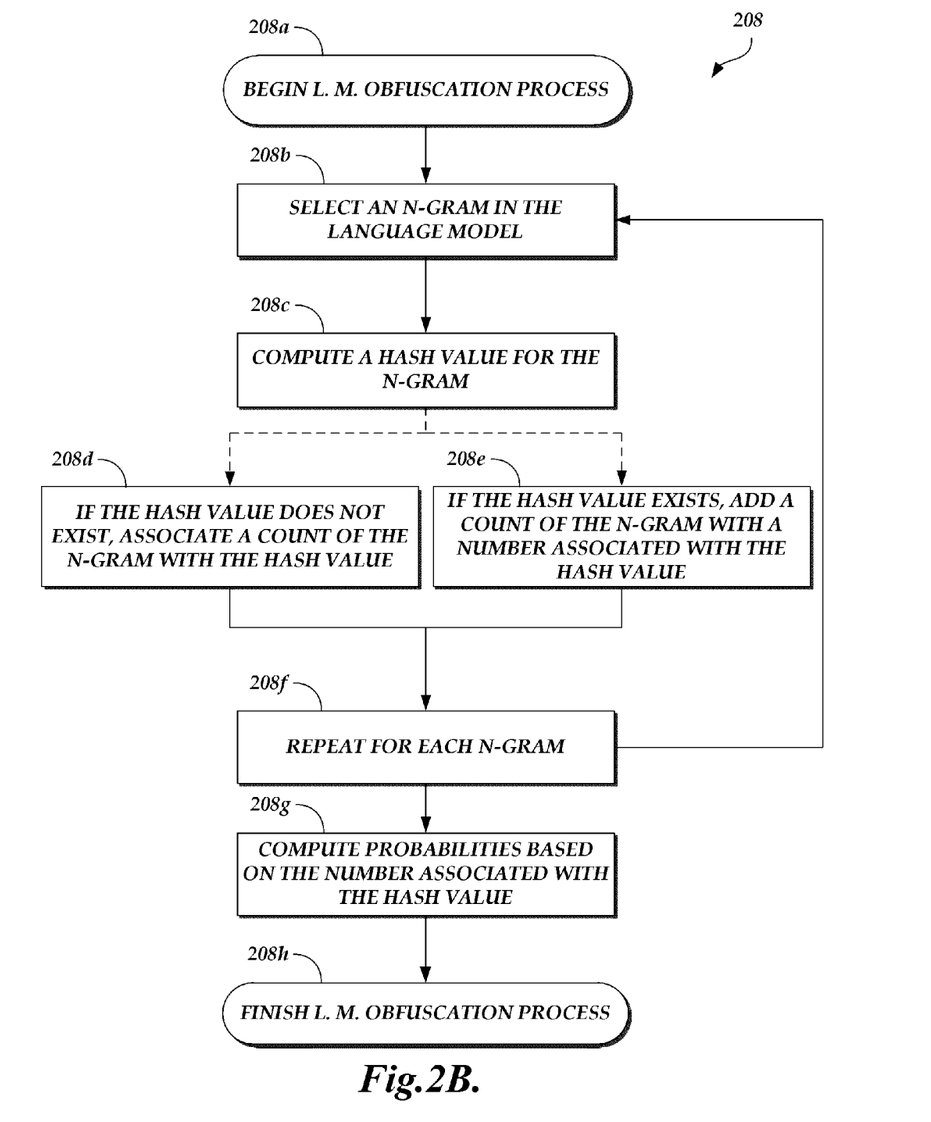
FIG. 2B is a flow diagram depicting an illustrative routine for obfuscating a language model.

FIG. 2B illustrates a routine 208 for obfuscating a language model using a Bloom filter. A text processing device 110, as described herein with respect to FIGS. 1 and 6, may be configured to execute the routine 208. The routine 208 begins at block 208a. The routine 208 may be an interactive routine initiated on demand by a user or an automated routine, such as might be executed on a periodic or aperiodic schedule. In one example, the routine 208 may obfuscate a language model prior to using the language model in a speech recognition system. In some cases, the routine 208 may be used to update a specific language model that has already been created, either by the routine 200 described above or by some other routine.

At block 208b, the routine 208 may select an n-gram in the constructed language model. As an example, the selected n-gram may have a number associated with it, such as a count representing the number of times the n-gram appeared in the corpus of text (e.g., a frequency of the n-gram in the corpus of text).

At block 208c, the routine 208 may compute a hash value for the selected n-gram. In an embodiment, computing the hash value may be referred to as any one or more of encoding, securing, scrambling, or anonymizing the selected n-gram.

For example, the selected n-gram may be mapped to a binary m-bit pattern. The hash value is described in more detail below with respect to FIG. 3.

In an embodiment, if the computed hash value does not already exist in the obfuscated language model, then the routine 208 at block 208d may associate the count of the n-gram with the hash value. In another embodiment, if the computed hash value does already exist in the obfuscated language model, then the routine at block 208e may update the count of the n-gram to the number currently associated with the hash value in the obfuscated language model. The sum may then represent a number of times an n-gram that corresponds to the computed hash value appeared in the corpus of text.

At block 208f, the routine 208 may repeat blocks 208b through 208d or 208e for each n-gram.

At block 208g, the routine 208 may compute probabilities for each hash value. The probabilities may be based on the count associated with the hash value. For example, the probabilities may be computed using a discounting scheme, a smoothing scheme, an interpolation scheme, a back-off smoothing scheme, or the like. After the probabilities are computed, the obfuscation process may be complete, as shown in block 208h.

Figure 3:
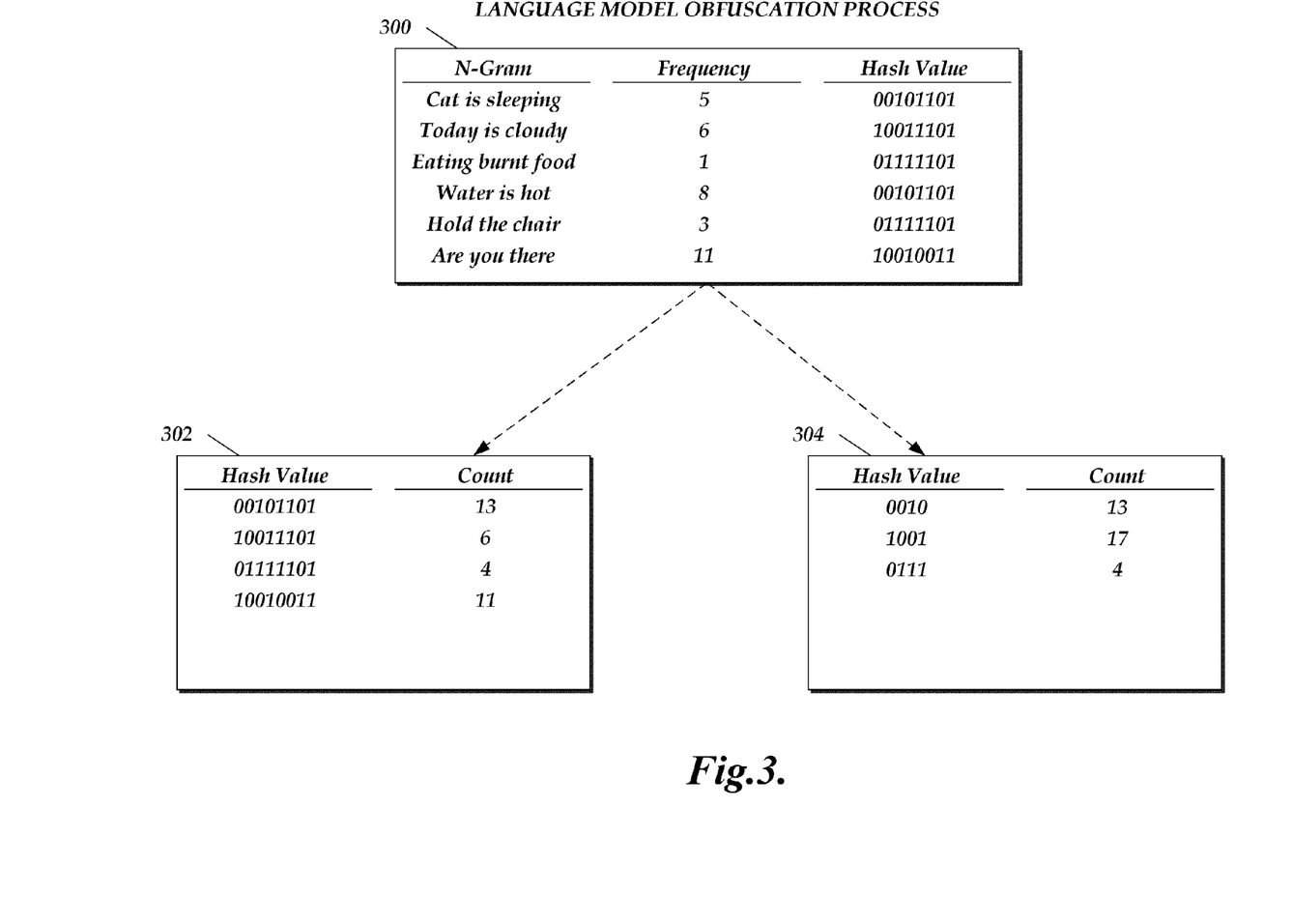
FIG. 3 is a diagram illustrating a process by which a language model may be obfuscated.

FIG. 3 illustrates an embodiment of a process by which an n-gram language model may be obfuscated. As described above, a hash function may be performed on one or more n-grams. The hash function may be performed on one or more n-grams by the text processing device 110. In an embodiment, box 300 illustrates a select list of possible n-grams, a frequency each n-gram occurs, and a possible hash value that each n-gram may correspond to. While box 300 illustrates each n-gram as being a trigam, the following may apply to any size n-gram. Likewise, each n-gram maps to an 8-bit binary hash value for illustrative purposes only, as each n-gram may map to any m-bit binary hash value.

In an embodiment, as with the number n, the number m may depend on the privacy setting level. For example, if the privacy setting is set to a low value, the number m may be a higher value (e.g., 16), and if the privacy setting is set to a high value, the number m may be a lower value (e.g., 8).

In some embodiments, a lower m value may provide greater privacy because it may result in a smaller number of possible unique bit patterns. If the number of unique n-grams exceeds the number of possible unique m-bit patterns, collisions, such as hash collisions, may occur. In an embodiment, collisions may result in two or more n-grams corresponding to the same hash binary m-bit pattern (e.g., exhibiting characteristics of a Bloom filter). This may make it more difficult to decipher the original text, even if the hash binary m-bit pattern is converted back into an n-gram. For example, in box 300, the n-grams "cat is sleeping" and "water is hot" both correspond to the hash value "00101101." Once the n-grams are converted into the hash value, it may be difficult to decipher whether the original text included the n-gram "cat is sleeping" or the n-gram "water is hot" due to the hash collision.

As described above, probabilities may be computed for each hash value. In an embodiment, the probabilities may be computed by associating a number (e.g., a count) with each hash value. For example, the number associated with each hash value may represent a number of times an n-gram that corresponds to the respective hash value appeared in the corpus of text. As illustrated in box 300, the n-grams "cat is sleeping" and "water is hot" correspond to the hash value "00101101," the n-gram "today is cloudy" corresponds to the hash value "10011101," the n-grams "eating burnt food" and "hold the chair" correspond to the hash value "01111101," and the n-gram "are you there" corresponds to the hash value "10010011." Since the n-gram "cat is sleeping" and the n-gram "water is hot" correspond to the same hash value, their occurrence counts may be summed (e.g., 13) and associated with the hash value, as illustrated in box 302. Likewise, the occurrence counts of the n-gram "eating burnt food" and the n-gram "hold the chair" may be summed (e.g., 4) and associated with their corresponding hash value. However, since neither "today is cloudy" nor "are you there" share a hash value with another n-gram, the counts of each respective n-gram (e.g., 6 and 11, respectively) may be associated with its corresponding hash value. The hash values and counts illustrated in box 302 may be transmitted to the speech recognition server device 140 for storage in the specific language model.

In other embodiments, even greater privacy may be desired. To achieve such privacy, the hash values may be partitioned such that a first set of bits of the hash binary m-bit pattern are transmitted to the speech recognition server device 140 for storage in the specific language model and a second set of bits of the hash binary m-bit pattern are not transmitted to the speech recognition server device 140, as illustrated in box 304. For example, the upper b bits of the hash binary m-bit pattern may be transmitted to the speech recognition server device 140, while the remaining bits are not. The upper b bits may not uniquely define an n-gram, and thus make it difficult to decipher the original text generated by the user. In box 304, the upper 4 bits of the hash value are transmitted to the speech recognition server device 140. Since the hash values "10011101" and "10010011" both share the same upper 4 bits, the frequencies of the n-grams that correspond to either hash value may be summed. Accordingly, as illustrated in box 304, the number associated with the upper 4 bits of "1001" may be 17 (e.g., the summation of 6, which is the count of "10011101," and 11, which is the count of "10010011").

In some embodiments, the same hash function is used on all n-grams. In other embodiments, a different hash function is used for each type of n-gram. For example, a first hash function may be performed on unigrams, a second hash function may be performed on bigrams, a third hash function may be performed on trigrams, and so on.

In some embodiments, the text processing device 110 may transmit information related to the hash function (e.g., the hash parameters, a hash public/private key, etc.) to the speech recognition server device 140. Information related to the hash function may aid during speech recognition, as described below with respect to FIG. 4A.

In some embodiments, as described above, the specific language model may be stored in the specific data store 150. Since the specific language model may be stored locally, privacy may not be as great a concern. Accordingly, the text processing device 110 may not perform a hash function on each n-gram. Instead, each n-gram (without any obfuscation) may be stored in the specific language model in the specific data store 150.

In still further embodiments, the text processing device 110 may not perform a hash function on each n-gram. Instead, each n-gram may be transmitted to the speech recognition server device 140 for storage in the global data store 160.

Using the Built Specific Language Model

In an embodiment, there are several ways in which speech recognition may be performed on an utterance spoken by a user using the specific language model. For example, the utterance may be received by the speech user interface 115 and transmitted to the speech recognition server device 140.

The speech recognition server device 140 may perform the speech recognition using some combination of a general purpose language model and the specific language model, and transmit the results to the speech user interface 115. This method of performing speech recognition is described below with respect to FIG. 4A.

As another example, the utterance may be received by the speech user interface 115 and transmitted to the speech recognition server device 140. The speech recognition server device 140 may perform the speech recognition using the general purpose language model and transmit the results to the speech user interface 115. The speech user interface 115 may then perform a second pass on the results (e.g., rescore the results) using the specific language model to obtain the final speech recognition results. This method of performing speech recognition is described below with respect to FIG. 4B.

As another example, the utterance may be received by the speech user interface 115, but not transmitted to the speech recognition server device 140. The speech recognition server device 140 may simply transmit a language model over the global network 125 to the speech user interface 115. The speech user interface 115 may then perform speech recognition using the transmitted language model. For example, the speech user interface 115 may identify characteristics of the user based on data stored within the speech user interface 115, the text processing device 110, and/or the user device 130 (e.g., user preferences, stored natural language text, etc.) or based on information provided directly by the user, and associate the user with one or more categories (e.g., sports, news, movies, outdoors, etc.). The global data store 160 may include one or more language models associated with each category, and the speech recognition server device 140 may transmit the language model(s) associated with the category or categories that the user is associated with to the speech user interface 115. The speech user interface 115 may perform the speech recognition using just the transmitted language model or using both the transmitted language model and the specific language model.

If the speech user interface 115 receives more than one language model, the language models may be weighted. The weights may be assigned to each language model based on the data stored within the speech user interface 115, the text processing device 110, and/or the user device 130 and/or information provided directly by the user. For example, based on the stored data or information provided directly by the user, the speech user interface 115 may determine a perplexity measurement for each language model. The perplexity measurement may indicate how relevant a particular language model is given a set of natural language text.

In some embodiments, when determining what was uttered by the user, the speech user interface 115 may use one of the transmitted language models (e.g., the language model with the highest weight). In other embodiments, the speech user interface 115 use some or all of the transmitted language models. The probabilities returned by each of the transmitted language models may be adjusted based on the language model weights. The weighted probabilities may then be used in determining what was uttered by the user (e.g., an average of all the weighted probabilities may be used, the highest weighted probability may be used, etc.).

Figure 4A:
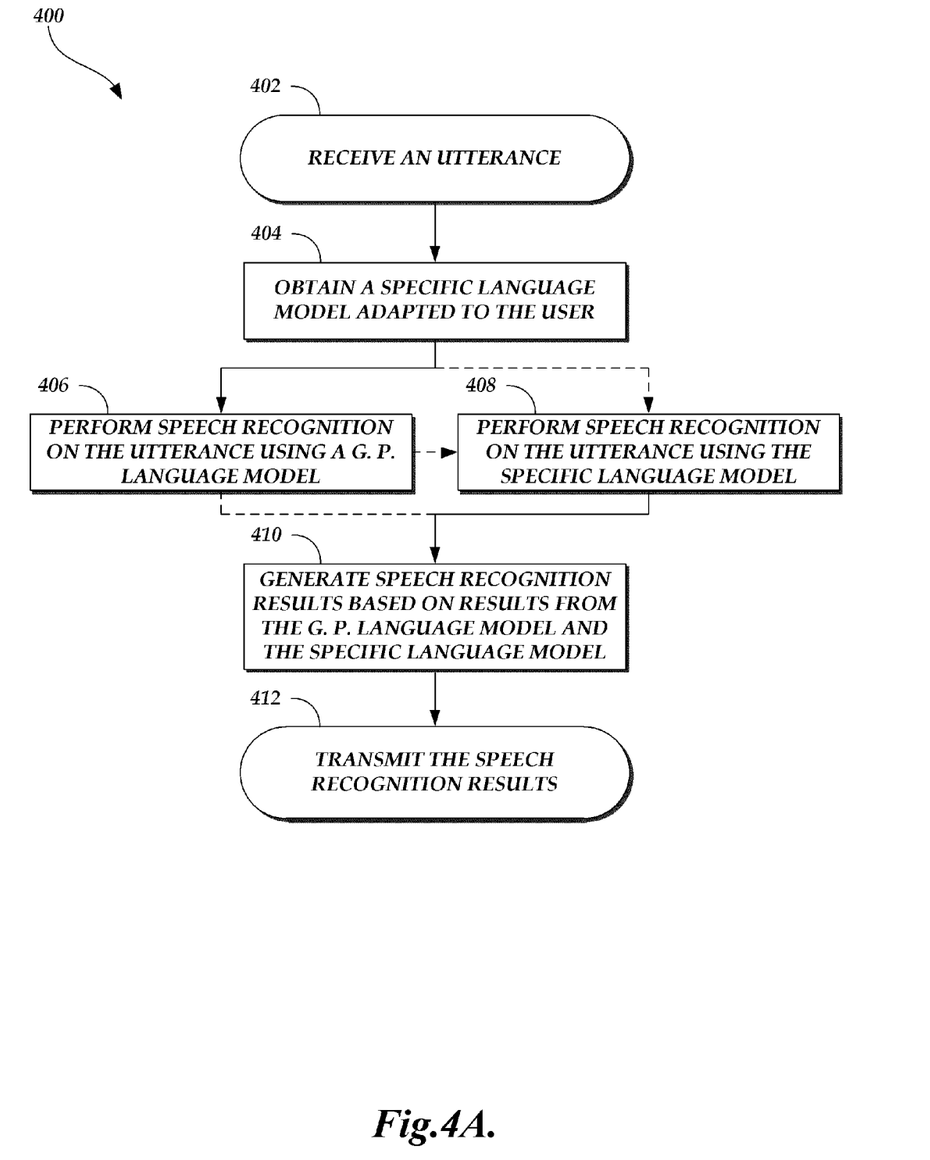
FIGS. 4A-B are flow diagrams depicting an illustrative routine for recognizing speech based on a specific language model.

FIG. 4A illustrates a routine 400 for performing speech recognition using the specific language model. A speech recognition server device 140, as described herein with respect to FIG. 1, may be configured to execute the routine 400. The routine 400 begins at block 402. The routine 400 may be an interactive routine initiated on demand by a user or an automated routine, such as might be executed on a periodic or aperiodic schedule. In one example, an utterance may be received for the purpose of determining what was spoken by a user. The routine 400 may query one or more language models to obtain speech recognition results.

At block 402, the routine 400 may receive an utterance. As described above, the utterance may be received from a speech user interface, such as the speech user interface 115 described above with respect to FIG. 1.

At block 404, the routine 400 may obtain a specific language model adapted to the user that made the utterance. In an embodiment, along with the utterance, the routine 400 may receive information related to an identity of the user that made the utterance. Such identity information may be used to select the appropriate specific language model. As described above, the specific language model may be stored in the global data store 160.

At block 406, the routine 400 may perform speech recognition on the utterance using a general purpose language model. As described above, the general purpose language model may be stored in the global data store 160.

At block 408, the routine 400 may perform speech recognition using the specific language model. Since the specific language model may contain obfuscated n-grams (e.g., hash values) rather than the n-grams themselves, the routine 400 may perform a hash function on the sequence of words that are to be analyzed in order to perform speech recognition using the specific language model. The routine 400 may perform the hash function using the hash parameters provided by the text processing device 110, as described above.

In an embodiment, the routine 400 performs block 408 in parallel with block 406. For example, the routine 400 may perform speech recognition on the utterance using the specific language model in parallel with performing speech recognition on the utterance using the general purpose language model.

In another embodiment, the routine 400 takes a two pass approach to speech recognition by performing block 408 after block 406. For example, the routine 400 may first perform speech recognition on the utterance using the general purpose language model. Then, at block 408, the routine 400 may rescore the results from block 406 using the specific language model.

In another embodiment, the routine 400 may perform speech recognition only once using an interpolated language model that may be created by interpolating the general purpose language model, the specific language model and/or other language models. The interpolation may be performed dynamically or prior to performing the speech recognition (e.g., using a batch operation, etc.).

At block 410, the routine 400 may generate speech recognition results based on a combination of the results from performing speech recognition using the general purpose language model and the specific language model. For example, if the routine 400 performs blocks 406 and 408 in parallel, the generated speech recognition results may be based on system combination of the results from blocks 406 and 408. As another example, if the routine 400 takes the two pass approach to speech recognition, the generated speech recognition results may be based on the rescored results computed by using the specific language model in block 408.

In an embodiment, the speech recognition results may include a lattice of possible word sequences and each word sequence's corresponding probability, an N-best list of possible word sequences, a sequence of words that was most likely uttered, or the like. After generating the speech recognition results, the routine 400 may transmit the speech recognition results, as shown in block 412. For example, the speech recognition results may be transmitted to the speech user interface 115 or another device.

As described above, the two pass approach may be carried out by the speech recognition server device 140. In some embodiments, operations to carry out the two pass approach may be performed by the speech user interface 115 and the speech recognition server device 140, as described below with respect to FIGS. 4B and 5.

Figure 4B:
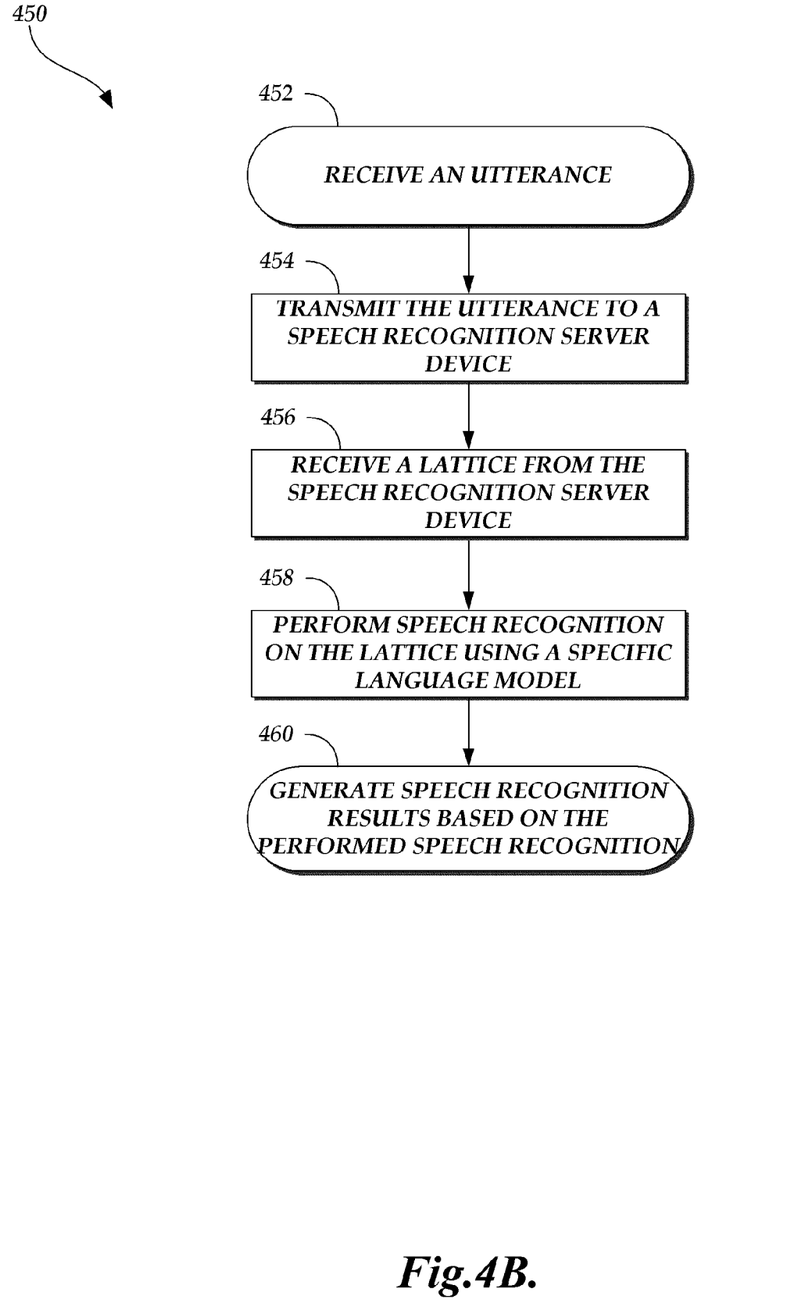

FIG. 4B illustrates another routine 450 for performing speech recognition using the specific language model. A speech user interface 115, as described herein with respect to FIG. 1, may be configured to execute the routine 450. The routine 450 begins at block 452. The routine 450 may be an interactive routine initiated on demand by a user or an automated routine, such as might be executed on a periodic or aperiodic schedule. In one example, an utterance may be received for the purpose of determining what was spoken by a user. The routine 450 may query a specific language model to obtain speech recognition results. At block 452, the routine 450 may receive an utterance. As described above, the utterance may be received via a microphone or a receiver.

At block 454, the routine 450 may transmit the utterance to the speech recognition server device 140. As described above, the speech recognition server device 140 may perform speech recognition on the utterance using the general purpose language model stored in the global data store 160. The speech recognition server device 140 may generate speech recognition results, which may include a lattice of possible word sequences and each word sequence's corresponding probability.

At block 456, the routine 450 may receive the lattice of possible word sequences and each word sequence's corresponding probability from the speech recognition server device 140.

At block 458, the routine 450 may perform speech recognition on the received lattice using the specific language model. In an embodiment, the routine 450 may use the specific language model to rescore the probabilities received from the speech recognition server device 140 in a manner as described above with respect to FIG. 4A.

After the speech recognition has been performed, the routine 450 may generate speech recognition results based on the performed speech recognition. As described above, the speech recognition results may include a lattice of possible word sequences and each word sequence's corresponding rescored probability, an N-best list of possible word sequences, a sequence of words that was most likely uttered, or the like.

Figure 5:
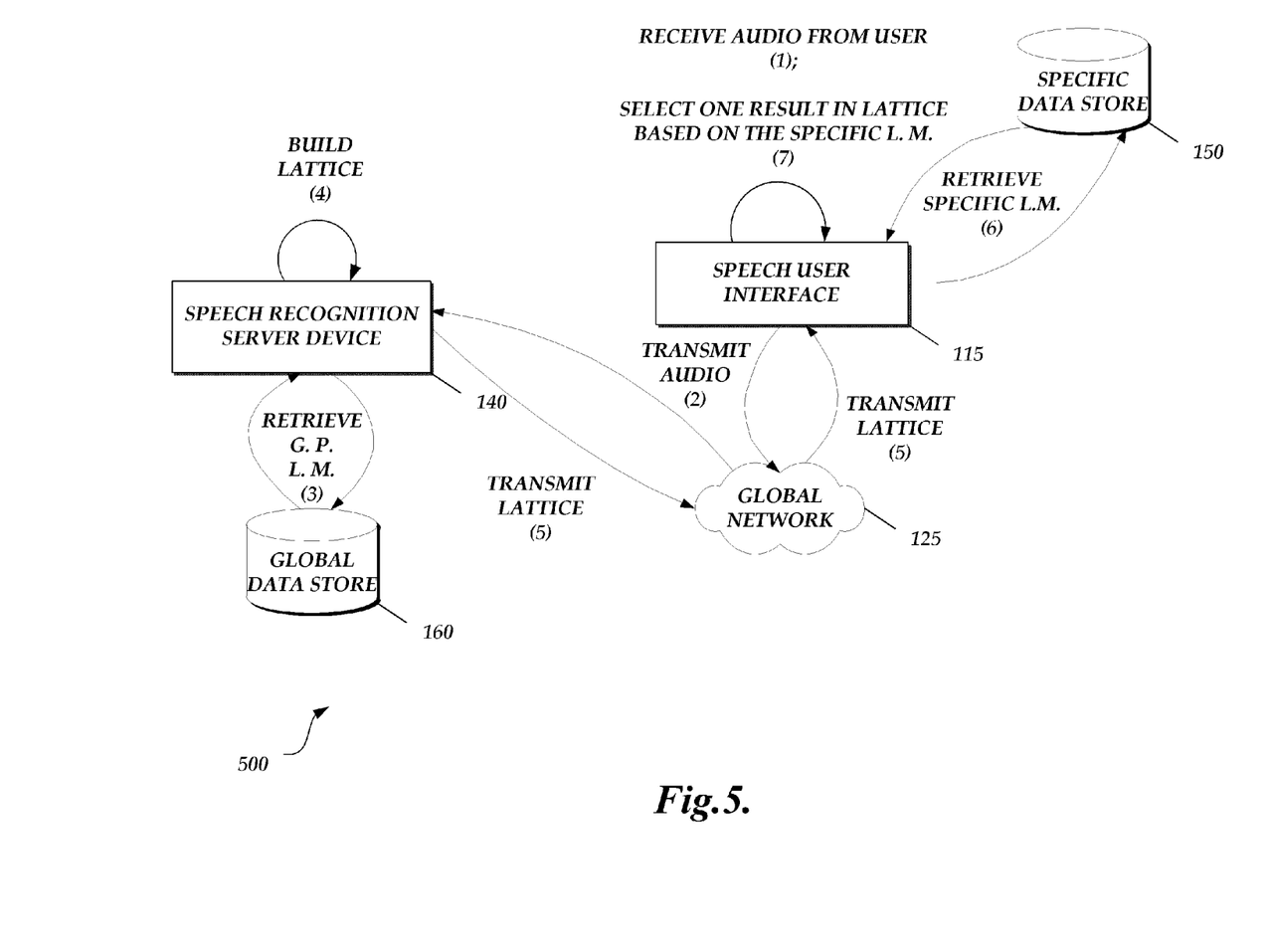
FIG. 5 is a state diagram depicting illustrative operations of a speech user interface and a speech recognition server device in an illustrative network environment.

FIG. 5 depicts several example operations that may be performed by a speech user interface 115 and a speech recognition server device 140 in the illustrative network environment 500 during speech recognition. While several example operations are discussed herein, other operations are possible and within the scope of this disclosure.

The speech user interface 115 may receive audio from a user (1). In an embodiment, the audio may be received by a microphone or other such input device and converted into an audio file.

In some embodiments, the speech user interface 115 may transmit the audio (2) to the speech recognition server device 140 via the global network 125. In addition, the speech user interface 115 may transmit information related to the audio to the speech recognition server device 140, such as a classification of in what context the utterance was made or the identity of the speaker of the utterance.

The speech recognition server device 140 may retrieve a general purpose language model (3) from the global data store 160 and use it to build a lattice (4) based on the received audio file. The lattice may include one or more possible word sequences uttered by the user as well as a probability associated with each word sequence.

After building the lattice using the general purpose language model, the speech recognition server device 140 may transmit the lattice (5) to the speech user interface 115 via the global network 125.

In some embodiments, the speech user interface 115 may retrieve the specific language model (6) associated with the user from the specific data store 150. As described above, the speech user interface 115 may rescore the probabilities of the word sequences in the lattice using the specific language model. Based on the rescoring, the speech user interface 115 may select one result in the lattice (7) as the word sequence that was most likely uttered by the user.

In an embodiment, the speech user interface 115 may output the selected result. For example, the speech user interface 115 may display the text of the selected result. In another example, the speech user interface 115 may convert the selected result into a command. The command may be executed by the speech user interface 115 or forwarded to another device for execution. In another example, the speech user interface 115 may transmit the selected result to another device, such as the user device 130.

Text Processing Device

Figure 6:
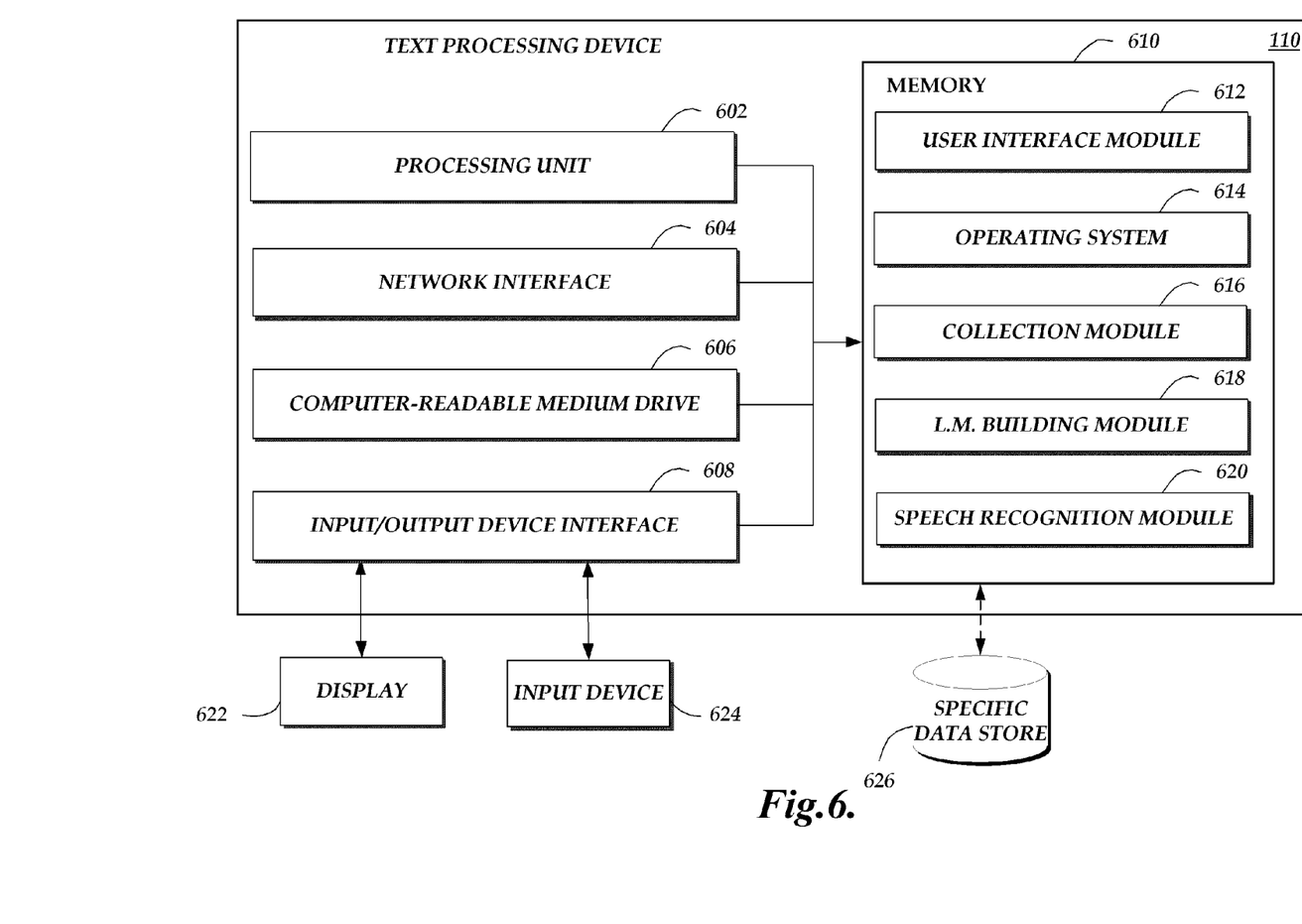
FIG. 6 is a schematic diagram of an illustrative text processing device.

FIG. 6 is a schematic diagram of a text processing device 110. The text processing device 110 includes an arrangement of computer hardware and software components that may be used to implement aspects of the present disclosure. Those skilled in the art will appreciate that the text processing device 110 may include more (or fewer) components than those shown in FIG. 6. It is not necessary, however, that all of these generally conventional components be shown in order to provide an enabling disclosure.

The text processing device 110 includes a processing unit 602, a network interface 604, a non-transitory computer-readable medium drive 606, and an input/output device interface 608, all of which may communicate with one another by way of a communication bus. As illustrated, text processing device 110 is optionally associated with, or in communication with, a display 622 and an input device 624. The display 622 and input device 624 may be used in embodiments in which users interact directly with the text processing device 110 (e.g., when the text processing device 110 is configured to perform the functions of the speech user interface 115 described above). The network interface 604 may provide the text processing device 110 with connectivity to one or more networks or computing systems. The processing unit 602 may thus receive information and instructions (such as utterances, language models, and text) from other computing systems or services via a network. The processing unit 602 may also communicate to and from memory 610 and further provide output information for a display 622 via the input/output device interface 608. The input/output device interface 608 may accept input from the input device 624, such as a keyboard, mouse, digital pen, touch screen, or gestures recorded via motion capture. The input/output device interface 624 may also output audio data to speakers or headphones (not shown) or receive audio input (such as an utterance) from a microphone or receiver.

The memory 610 may contain computer program instructions that the processing unit 602 may execute in order to implement one or more embodiments of the present disclosure. The memory 610 generally includes RAM, ROM and/or other persistent or non-transitory computer-readable storage media. The memory 610 may store an operating system 614 that provides computer program instructions for use by the processing unit 602 in the general administration and operation of the text processing device 110. The memory 610 may further include other information for implementing aspects of the present disclosure. For example, in one embodiment, the memory 610 includes a user interface module 612 that facilitates generation of user interfaces (such as by providing instructions therefor) for display upon a computing device.

In addition, memory 610 may optionally include or communicate with the specific data store 626. The specific data store 626 may contain a language model, such as a specific language model associated with the user of the text processing device or the user device. The specific data store 626 may be embodied in hard disk drives, solid state memories, and/or any other type of non-transitory computer-readable storage medium accessible to the text processing device 110. The specific data store 626 may also be distributed or partitioned across multiple storage devices as is known in the art without departing from the spirit and scope of the present disclosure. In an embodiment, the specific data store 626 may be similar to the specific data store 150 as illustrated with respect to FIG. 1.

In addition to the user interface module 612, the memory 610 may include a collection module 616 that may be executed by the processing unit 602. In one embodiment, the collection module 616 implements aspects of the present disclosure. For example, the collection module 616 may be used to collect or receive corpora of text from other devices. The collection module 616 may collect or receive corpora of text when the text processing device 110 is coupled to another device, like the user device 130, or when the text processing device 110 is on the local network 120. As described above, the collection module 616 may collect the text directly from another device, may receive the text from another device via an application executed by the other device, or may collect the text by monitoring traffic on the local network 120.

In addition to the collection module 616, the memory 610 may include a language model building module 618 that may be executed by the processing unit 602. In one embodiment, the language model building module 618 implements aspects of the present disclosure. For example, the language model building module 618 may be used to build a language model based on the collected or received text. In some embodiments, the language model building module 618 may create an obfuscated version of the language model by, for example, converting the corpora of text into n-grams and performing hash functions on the n-grams to generate hash values, as described above.

In addition to the language model building module 618, the memory 610 may include an optional speech recognition module 620. In one embodiment, the speech recognition module 620 implements aspects of the present disclosure. For example, as described above, the text processing device 110 may perform the functions of the speech user interface 115 (e.g., participate in the speech recognition process). The speech recognition module 620 may receive an utterance via the input device 624 and transmit the utterance to the speech recognition server device 140. In those instances in which the speech recognition server device 140 performs speech recognition using the general purpose language model and the specific language model, the speech recognition module 620 may receive the speech recognition results from the speech recognition server device 140 and output a result. In some embodiments, the result may include an audio signal that is outputted by the input/output device interface 608 (e.g., a reading of the text that is selected as most likely uttered by the user), a command that is executed by the processing unit 602 or by another device, text that is transmitted to another device via the network interface 604, or the like.

In those instances in which a two pass approach is taken for performing speech recognition, the speech recognition module 620 may receive a lattice of possible word sequences and their associated probabilities from the speech recognition server device 140 after the speech recognition server device 140 performed speech recognition on a received utterance using the general purpose language model. The speech recognition module 620 may retrieve a specific language model (e.g., from the specific data store 626) and rescore the probabilities using the specific language model. The speech recognition module 620 may then output a result as described above.

The text processing device 110 may be embodied in a variety of environments, and may be represented as a single computing device or as multiple computing devices. For example, in some embodiments, the text processing device 110 is implemented as one or more backend servers capable of communicating over a network. In other embodiments, the text processing device 110 is implemented by one more virtual machines in a hosted computing environment. The hosted computing environment may include one or more rapidly provisioned and released computing resources, which computing resources may include computing, networking and/or storage devices. A hosted computing environment may also be referred to as a cloud computing environment. In still other embodiments, the text processing device 110 may be represented as a user computing device capable of communicating over a network, such as a laptop or tablet computer, personal computer, personal digital assistant (PDA), hybrid PDA/mobile phone, mobile phone, global positioning system (GPS) device, electronic book reader, set-top box, camera, clock, audiobook player, digital media player, video game console, in-store kiosk, television, one or more processors, integrated components for inclusion in computing devices, appliances, electronic devices for inclusion in vehicles or machinery, gaming devices, or the like.

It should be noted that the speech recognition server device 140 may include some or all of the components present in the text processing device 110 as discussed herein with respect to FIG. 6. In addition, the speech recognition server device 140 may include additional components not present in the text processing device 110 as discussed herein with respect to FIG. 6.

TERMINOLOGY

Many of the operations of the present disclosure are sufficiently mathematically or technically complex that one or more computing devices may be necessary to carry them out. For example, analyzing a corpus of text to generate a language model, as well as computing the various probabilities, error function values, and relative entropies discussed above, effectively requires resort to a computing device owing to the volume and complexity of the calculations involved. Additionally, a computing device may also be required to generate speech transcriptions and to communicate over a network.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multithreaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An example storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

The invention claimed is:

1. A system comprising:
    an electronic data store configured to store data related to a user; and
    a text processing device in communication with the electronic data store, the text processing device configured to:
        obtain text data from a user computing device;
        construct an n-gram based on the text data;
        generate, for the n-gram, a hash value;
        determine, for the n-gram, a first count indicating a number of times the n-gram appears within the text data;
        add the first count to a second count, wherein the second count is associated with the hash value; and
        store the hash value and the second count in the electronic data store; and
    transmit the hash value and the second count to a server device over a network, wherein the server device is configured to:
        receive the hash value and the second count;
        determine a specific n-gram probability using the hash value and the second count;
        obtain a general n-gram probability from a general language model;
        determine a combined n-gram probability using the specific n-gram probability and the general n-gram probability; and
        perform speech recognition using the combined n-gram probability.

2. The system of claim 1, wherein the text processing device is configured to obtain text data from the user computing device by monitoring network traffic generated by the user computing device.

3. The system of claim 1, wherein the text processing device is configured to obtain text data from data received directly from the user computing device.

4. The system of claim 1, wherein a number of bits of the hash value is based on a privacy setting.

5. The system of claim 1, wherein the n-gram comprises a trigram.

6. The system of claim 1, wherein the text processing device is further configured to store metadata associated with the n-gram in the electronic data store, wherein metadata associated with the n-gram is one of a source of the n-gram, information about an entity associated with the n-gram, or a date and time when the text data was obtained.

7. A non-transitory computer-readable medium comprising a module configured to execute in one or more processors of a computing device, the module being further configured to:
    receive text data, wherein the text data originated from a user computing device;
    construct an n-gram based on the text data;
    generate, for the n-gram, a hash value, wherein a number of bits of the hash value is based on a privacy setting;
    determine language model information associated with the hash value;

store the hash value and the language model information in an electronic data store; and transmit the hash value and the language model information to a server device.

8. The non-transitory computer-readable medium of claim 7, wherein the language model information is a count.

9. The non-transitory computer-readable medium of claim 7, wherein the language model information is a tri-gram probability.

10. The non-transitory computer-readable medium of claim 7, wherein the server device is configured to store the hash value and the language model information in a language model.

11. The non-transitory computer-readable medium of claim 7, wherein the module is further configured to monitor network traffic generated by the user computing device, and wherein the text data comprises network traffic generated by the user computing device.

12. The non-transitory computer-readable medium of claim 7, wherein the network interface module is further configured to receive the text data directly from the user computing device.

13. The non-transitory computer readable medium of claim 7, wherein the computing device comprises the user computing device.

14. The non-transitory computer-readable medium of claim 7, wherein the language model building module is further configured to store metadata associated with the n-gram in the electronic data store, wherein the metadata associated with the n-gram comprises a source from which the n-gram is generated, an entity associated with the n-gram, or a date and time when the text data was generated.

15. The non-transitory computer readable medium of claim 7, wherein the text data comprises at least one of an electronic message, a document, a music library, or a contact list.

16. A computer-implemented method comprising:
as implemented by a server device configured with specific computer-executable instructions,
obtaining a first n-gram probability for an n-gram from a first language model;
determining, by the server device executing a language model building module, a hash value for the n-gram;
obtaining a second n-gram probability from a second language model using the hash value;
determining a third n-gram probability using the first n-gram probability and the second n-gram probability; and
performing speech recognition using the third n-gram probability.

17. The computer-implemented method of claim 16, wherein determining the third n-gram probability comprises using language model interpolation.

18. The computer-implemented method of claim 16, wherein obtaining the first n-gram probability comprises determining a second hash value for the n-gram and obtaining the first n-gram probability from a language model using the second hash value.

19. The computer-implemented method of claim 18, wherein the second hash value has a larger number of bits than the hash value.

20. The computer-implemented method of claim 16, wherein the first language model is a general purpose language model and the second language model is a specific language model adapted to a user.

21. The computer-implemented method of claim 16, wherein determining a third n-gram probability using the first n-gram probability and the second n-gram probability comprises performing a batch operation prior to performing speech recognition.

22. A system comprising:
a server device configured to:
obtain a first n-gram probability for an n-gram from a first language model;
determine a hash value for the n-gram;
obtain a second n-gram probability from a second language model using the hash value;
determine a third n-gram probability using the first n-gram probability and the second n-gram probability; and
perform speech recognition using the third n-gram probability.

23. The system of claim 22, wherein the server device is configured to determine the third n-gram probability by using language model interpolation.

24. The system of claim 22, wherein the server device is configured to obtain the first n-gram probability by determining a second hash value for the n-gram and obtaining the first n-gram probability from a language model using the second hash value.

25. The system of claim 24, wherein the second hash value has a larger number of bits than the hash value.

26. The system of claim 22, wherein the first language model is a general purpose language model and the second language model is a specific language model adapted to a user.

27. The system of claim 22, wherein the server device is configured to determine a third n-gram probability using the first n-gram probability and the second n-gram probability by performing a batch operation prior to performing speech recognition.

28. A system comprising:
an electronic data store configured to store data related to a user; and
a text processing device in communication with the electronic data store, the text processing device configured to:
obtain text data from a user computing device;
determine a first count indicating a number of times a portion of the text data appears within the text data;
add the first count to a second count, wherein the second count is associated with a representation of the portion of the text data, wherein the representation of the portion of the text data comprises a hash value, and wherein a number of bits of the hash value is based on a privacy setting;
store the representation of the portion of the text data and the second count in the electronic data store; and
transmit the representation of the portion of the text data and the second count to a server device over a network, wherein the server device is configured to perform speech recognition using the representation of the portion of the text data and the count.

29. The system of claim 28, wherein the portion of the text data comprises an n-gram.

30. The system of claim 29, wherein the server device is further configured to:
receive the hash value and the second count;
determine a specific n-gram probability using the hash value and the second count;
obtain a general n-gram probability from a general language model;

determine a combined n-gram probability using the specific n-gram probability and the general n-gram probability; and perform speech recognition using the combined n-gram probability.

31. The system of claim 29, wherein the portion of the text data comprises a trigram, and wherein the representation of the portion of the text data is unique.

32. The system of claim 29, wherein the text processing device is further configured to store metadata associated with the n-gram in the electronic data store, wherein metadata associated with the n-gram comprises a source of the n-gram, an information about an entity associated with the n-gram, and a date and time when the text data was obtained.

33. The system of claim 28, wherein the text processing device is configured to obtain text data from the user computing device by monitoring network traffic generated by the user computing device.

34. The system of claim 28, wherein the text processing device is configured to obtain text data from data received directly from the user computing device.

* * * * *